Feb. 2, 1926.                                        1,571,248
F. EICKHOFF
TIRE TREAD ADVERTISING DEVICE
Filed June 12, 1925           2 Sheets-Sheet 1
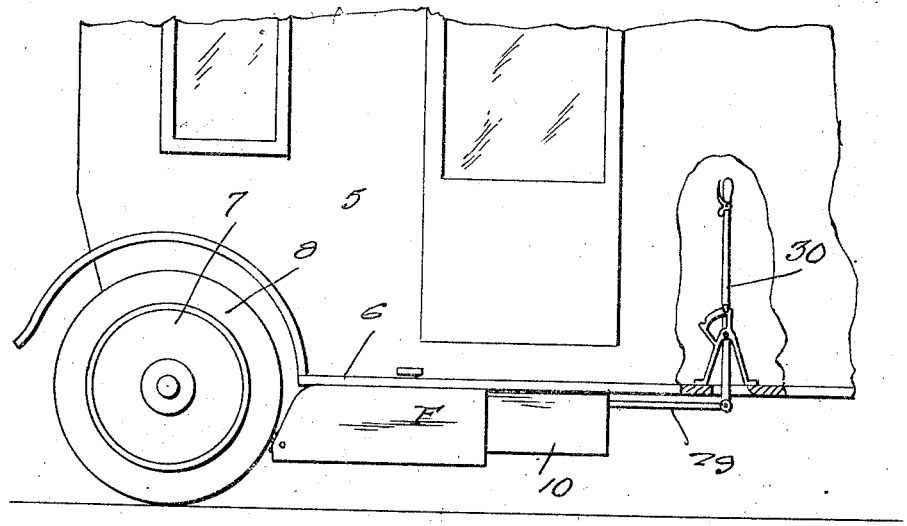
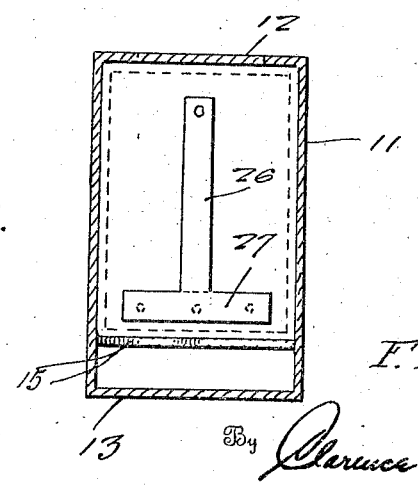
Inventor
F. Eickhoff
By Clarence A. O'Brien
Attorney Feb. 2, 1926. 1,571,248
F. EICKHOFF
TIRE TREAD ADVERTISING DEVICE
Filed June 12, 1925  2 Sheets-Sheet 2
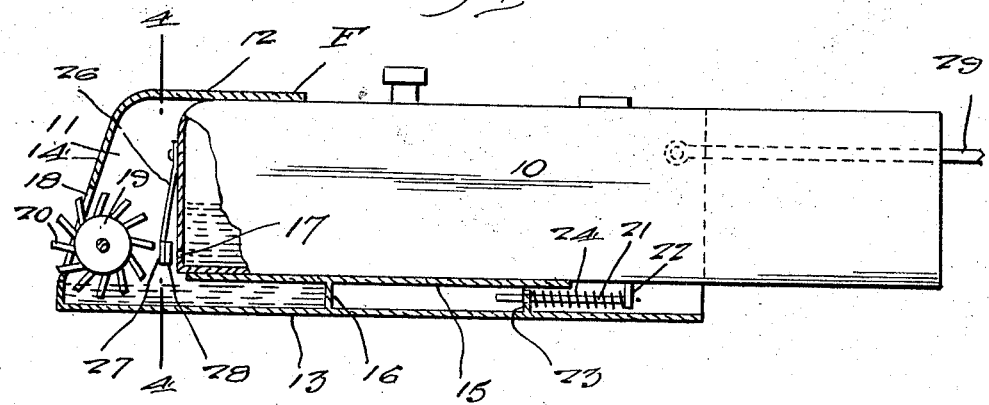
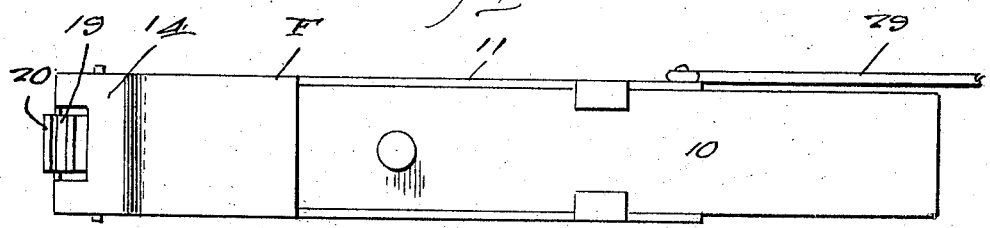
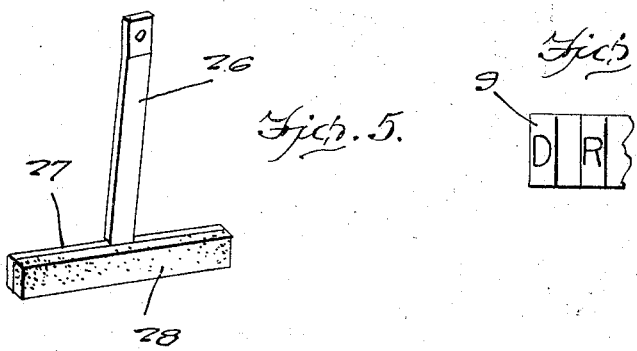
Inventor
F. Eickhoff
By Clarence A. O'Brien
Attorney Patented Feb. 2, 1926.

1,571,248

UNITED STATES PATENT OFFICE.

FRIEDRICH EICKHOFF, OF ROCHESTER, NEW YORK.

TIRE-TREAD ADVERTISING DEVICE.

Application filed June 12, 1925. Serial No. 36,661.

*To all whom it may concern:*

Be it known that I, FRIEDRICH EICKHOFF, a citizen of the United States, residing at Rochester, in the county of Monroe and State of New York, have invented certain new and useful Improvements in Tire-Tread Advertising Devices, of which the following is a specification.

The present invention relates to an apparatus which may be used with a vehicle such as an automobile, for applying a suitable printing or inking solution to the tire of a wheel thereof, in order that advertising matter may be printed on the roadway.

At the present time it is a common practice to provide the tread of a tire with a non-skid surface which, in my invention, would be in the form of type of the like, so that when a solution is applied thereto, said tread would print on the roadway certain indicia which should be used for advertising and the like.

Another important object of the invention is to provide an apparatus of this nature, which is exceedingly simple in its construction, easy to manipulate and regulate, strong, durable, inexpensive to manufacture, efficient and reliable in operation, not likely to easily become out of order and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 1 represents a fragmentary side elevation of an automobile having my improved advertising device associated with one wheel thereof.

Figure 2 is a side elevation of the inking apparatus showing portions in section.

Figure 3 is a top plan view thereof.

Figure 4 is a transverse section therethrough taken on the line 4—4 of Figure 2.

Figure 5 is a detail perspective of the valve,

Figure 6 is a detail perspective showing a portion of the tread of the tire, and Figure 7 is a plan view showing fragmentarily a tire and the printing done thereby.

Referring to the drawing in detail, it will be seen that 5 designates generally an automobile, which includes among other well known elements a running board 6, a wheel 7 having a tire 8 thereon provided with the tread 9 and having type projections formed thereon.

My improved print inking apparatus is shown suspended from the running board 6, in close proximity to the tire tread 9. This apparatus includes a tank 10 having a frame F slidable over one end. This frame F includes a pair of parallel side walls 11, a top wall 12, a bottom wall 13 and a slanting end wall 14. A panel 15 is supported above the bottom 13 by a partition 16 and slides against the bottom of the tank 10. Openings 17 are provided in the end of the tank 10, over which is slidable the frame F, so that liquid in the tank 10 will be supplied to the frame. The end wall portion 14 is provided with an opening 18, and an ink applying member is rotatable in the frame and has flexible fingers 20 on its periphery, which are adapted to dip in the ink solution in the frame and to be extended through the opening 18 for applying the ink to the tread 9 of the tire 8. A rod 21 is fixed to a lug 22 depending from the bottom of the tank and extends through a lug 23 upstanding from the bottom 13. A spring 24 is disposed above the rod 21 between the lugs 22 and 23 and normally holds the frame extended, as is shown in Figures 1 and 2, whereby the ink applying member 19 will be actively associated with the tread 9 of the tire 8. A spring 26 is fixed at one end to the tank 10 within the frame F and the other end thereof is sprung away from said end of the tank and is provided with a head 27 having suitable padding 28 thereon. The head and pad are closeable over the openings 17. A rod 29 is pivoted to one side of the frame F and to the lower end of the lever 30 mounted at a convenient portion of the automobile 5, in order that access may be had thereto. By swinging the lever 30 to pull the rod 29 forwardly, it will be seen that the frame 11 may be moved to bring the member 19 in engagement with the head 27 thereby closing the pad 28 over the opening 17, thereby causing a valve structure to prevent further supply of the ink solution to the frame and at the same time withdrawing the member 19 so that its fingers 20 will no longer engage the tire tread.

It is thought that the construction, operation, and advantages of the invention, will now be clearly understood, without a more detailed description. It is desired, however, to point out that the present embodiment of the invention has been disclosed merely by way of example, and in practice attains all of the features of advantage enumerated as desirable in the statement of the invention and the above description. It is apparent that numerous changes in the details of construction and in the combination and arrangement of parts may be resorted to, without departing from the spirit or scope of the invention as hereinafter claimed or sacrificing any of its advantages.

Having thus described my invention, what I claim as new is:

1. A printing solution applicator comprising a tank, a frame slidable over one end of the tank, said end provided with openings, a rotatable member in the frame, flexible fingers on said rotatable member, said frame having an opening through which the fingers may project to apply the solution to a tire tread.

2. A printing solution applicator comprising a tank, a frame slidable over one end of the tank, said end provided with openings, a rotatable member in the frame, flexible fingers on said rotatable member, said frame having an opening through which the fingers may project to apply the solution to a tire tread, said frame being slidably mounted on the tank, means for urging the frame normally away from the tank, and means for drawing the frame toward the tank, and thereby disengaging the fingers from the tire tread.

3. A printing solution applicator comprising a tank, a frame slidable over one end of the tank, said end provided with openings, a rotatable member in the frame, flexible fingers on said rotatable member, said frame having an opening through which the fingers may project to apply the solution to a tire tread, said frame being slidably mounted on the tank, means for urging the frame normally away from the tank, and means for drawing the frame toward the tank, and thereby disengaging the fingers from the tire tread, a valve structure on the end of the tank engageable by the member in the frame to close over the openings in the end of the tank when said frame is drawn toward the tank.

4. A printing solution applicator comprising a tank, a frame slidable over one end of the tank, said end of the tank provided with an opening, a member for applying ink from the frame mounted in said frame, means for urging the frame normally away from the tank to maintain said member in engagement with a tire tread, and means for drawing the frame toward the tank so as to disengage the member from the tire tread.

5. A printing solution applicator comprising a tank, a frame slidable over one end of the tank, said end of the tank provided with an opening, a normally open valve on said end of the tank and associated with said opening, a member mounted on the frame for applying ink to the tread of a tire, means for urging the frame normally away from the tank to maintain said member in engagement with the tread, and means for drawing the frame toward the tank to disengage said member from the tread of the tire and engage said member with the valve to close the same against the opening.

In testimony whereof I affix my signature.

FRIEDRICH EICKHOFF.